United States Patent
Hamed et al.

(12)

(10) Patent No.: US 6,861,487 B2
(45) Date of Patent: Mar. 1, 2005

(54) CATALYST PRECURSOR FOR THE POLYMERIZATION OF OLEFINS AND POLYMERIZATION PROCESS USING THE SAME

(75) Inventors: Orass Hamed, Riyadh (SA); Akhlaq A. Moman, Riyadh (SA); Atieh Abu-Raqabah, Riyadh (SA); Abdulaziz Al-Nezari, Riyadh (SA)

(73) Assignee: Saudi Basic Industries Corporation (SA)

( * ) Notice: Subject to any disclaimer, the term of this patent is extended or adjusted under 35 U.S.C. 154(b) by 0 days.

(21) Appl. No.: 10/414,118

(22) Filed: Apr. 15, 2003

(65) Prior Publication Data

US 2004/0209764 A1 Oct. 21, 2004

(51) Int. Cl.$^7$ .................................................. C08F 4/42
(52) U.S. Cl. ..................... 526/160; 526/123.1; 526/943; 502/152; 502/117; 502/110; 502/103
(58) Field of Search ................................. 503/152, 117, 503/103, 110; 526/160, 943, 123.1; 502/152, 117, 103, 110

(56) References Cited

U.S. PATENT DOCUMENTS 6,288,182 B1 * 9/2001 Hamed et al. ........... 526/124.3
6,403,520 B1    6/2002 Hamed et al.

FOREIGN PATENT DOCUMENTS

| DD | 282 013 A | 8/1990 |
| DD | 282 013 A5 * | 8/1990 |
| DE | 197 06 409 A | 8/1998 |

* cited by examiner

Primary Examiner—Ling-Sui Choi
(74) Attorney, Agent, or Firm—Kramer Levin Naftalis & Frankel (57) ABSTRACT

The present invention relates to a catalyst precursor for homo- or copolymerization of olefins comprising a metallocene compound, a magnesium containing compound and a thermoplastic polymer support, and optionally further comprising a metal alkoxy compound, an aluminum containing compound, a silicon containing compound and/or an alcohol. The invention further relates to the process of polymerizing olefins using the inventive catalyst precursor.

19 Claims, 3 Drawing Sheets

CATALYST PRECURSOR FOR THE POLYMERIZATION OF OLEFINS AND POLYMERIZATION PROCESS USING THE SAME

FIELD OF THE INVENTION

The present invention relates to a catalyst precursor for homo- or copolymerization of olefins, and to a polymerization process for homo- or copolymerization of olefins using that catalyst precursor.

DESCRIPTION OF THE PRIOR ART

Metallocene catalyst systems have been known for quite a while, since Wilkinson and Fischer worked out the structure of the ferrocene compound in 1952. Especially titanocene and zirconocene catalyst systems showed high activity with standard aluminium alkyls, such as triethyl aluminium and triisobutyl aluminium, as cocatalyst in polymerizing olefins. This new category of compounds, with their unique spatial arrangement reminiscent of a sandwich, gave the field of organometallic chemistry great interest, but unfortunately did not have the same impact on industry yet.

In the following, the term "metallocene" is meant for the typical metallocene having two cyclopentadienyl ligands, as well as for the metal organic compounds having only one cyclopentadienyl ring.

These catalysts have the advantage of being single sited systems producing homogeneous high molecular weight polymers with narrow molecular weight distribution (MWD) at high activity. Nevertheless, there are a number of disadvantages which caused many of these metallocene systems difficult to commercialize. These disadvantages are mainly the high cost of these metallocene systems, the desorption (leaching) of the metallocene precursors from their supports which usually causes the generation of fines and accordingly causes reactor fouling. In result, the polymerization process ends up producing low bulk density polymers with poor morphology. That's why a supported metallocene catalyst system with similar excellent performance as the conventional Ziegler-Natta catalysts is a goal yet to be achieved.

It is well known that catalyst systems which exhibit a fast polymerization rate at the very beginning of the reaction followed by a sharp decrease (decay type kinetics), tend to produce polymers with poor morphology by destroying the original catalyst particle. Whilst, those showing slow build up type kinetic profiles followed by a long stationary polymerization rate, produce the best polymer resins of excellent morphology and high bulk density.

The conventional Ziegler-Natta catalyst comprises a catalyst precursor of a transition metal halide, such as titanium tetrachloride, and a cocatalyst, preferably trimethyl aluminium. A support on magnesium halides was preferred. However, use of the conventional Ziegler-Natta catalysts resulted in poor polymerization activities and in polymers having high contents of support material and low stereospecificity with regard to alpha-olefins. Metallocene compounds had been used only for scientific examinations due to their even lower activity compared to the conventional Ziegler-Natta catalysts.

However, the situation changed dramatically in 1975 when water accidentally got into a test tube used for NMR measurement which contained biscyclopentadienyl titanium, trimethyl aluminium and ethene. This system polymerized quickly, as reported by W. Kaminsky and resulted in the isolation of MAO as the active cocatalyst in 1977. Accordingly, since the discovery of these catalyst systems, extensive research work was conducted in order to improve the performance and the quality of the produced metallocene polymers. Hans Brintzinger from Konstanz University synthesized chiral ansa-bisindenyl titanocenes with C2 symmetry in 1982, which were later on used in 1984 by Exxon in combination with MAO to first demonstrate the synthesis of isotactic polypropylene. Ewen and Razavi demonstrated that syndiotactic polypropylene could be prepared by using another zirconium metallocene having C5 symmetry and cyclopentadienyl and fluorenyl ligands. Dow then made a remarkable achievement in synthesizing titanium cyclopentadienyl amido compounds (constrained geometry catalysts) in 1990, which were found extremely useful in ethylene and long chain alpha olefin copolymerization. These catalysts have the advantage of being single sited systems producing homogeneous high molecular weigh polymers with narrow MWD at high activity. Nevertheless, there are a number of disadvantages which caused many of these metallocene systems difficult to commercialize.

On the other hand, conventional Ziegler-Natta catalysts often show limited activity, which reflects on the high catalyst residues. Whilst the metallocene-based catalysts intrinsically posses high activity, the catalyst precursors and in particular the cocatalysts required for polymerization, such as aluminoxanes or borane compounds, are very expensive, fairly unstable and have a lengthy method of preparation.

Generally, the active precursors of both Ziegler-Natta and metallocene catalysts are supported on inert carriers to enhance the catalyst productivity and to improve and control the product morphology.

Magnesium chloride and silica predominantly have been used for the preparation of supported olefin polymerization catalysts. Lately, many workers used polymeric supports similar to that of the present invention as reported in U.S. Pat. No. 4,900,706, U.S. Pat. No. 5,118,648, U.S. Pat. No. 5,587,439, U.S. Pat. No. 5,610,115, U.S. Pat. No. 5,707,914 and U.S. Pat. No. 6,100,214.

In ethylene polymerization and co-polymerization, there have been a number of published research work which attempted to improve the polymer particle formation by using slid catalyst synthesized by supporting titanium-magnesium compounds on silica gel, as disclosed in U.S. Pat. No. 4,315,999. On that patent the inventors have proposed a method to improve the properties of the particles by using a solid catalyst synthesized by impregnating silica gel with titanium-magnesium compound. Regardless the fact that the produced polymer particles in that case are improved, silica gel as carrier support remains in the product causing higher ash levels and fisheye in the film affecting negatively on the quality of the end product.

On the other hand, many workers have prepared supported catalyst systems by treating the support, for example silica, with both an organoaluminum and an organomagnesium compound. The treated support was then contacted with a tetravalent titanium compound. Others have also prepared different systems by first reacting a silica support with a Grignard reagent and then combining the mixture with a tetravalent titanium compound.

However, procedures typically used for the preparation of suitable magnesium chloride and silica supports such as spray drying or recrystallisation processes are complicated and expensive. Hence, all methods described in the aforementioned patents of catalyst preparation present the inconvenience of being complicated, expensive and do not allow consistency of particle size and particle size distribution. Also, despite the extensive and increasing use of the described supports for olefin polymerization catalysts, the support materials themselves have several deficiencies. For example, in the case of silica high calcination temperatures are required to remove water, which is a common catalyst poison.

This represents a significant proportion of the preparation time of the catalyst. Further, silica supported metallocene catalyst preparation typically requires the use of aluminoxane compounds in catalyst preparation, this is typically done by contacting silica with an aluminoxane prior to the deposition of the metallocene component. This procedure is complicated and expensive. Also, the use of silica or magnesium chloride as a support results in the support remaining largely in the product, which can affect the product properties, such as optical properties, or processing.

It is an object of the present invention to provide a catalyst precursor which overcomes at least some of the drawbacks encountered in the prior art, especially to synthesize a cost effective catalyst precursor capable of producing in combination with a co-catalyst polymers with superior morphology and higher bulk densities suitable for gas phase process technology.

Further, it is an object of the present invention to provide a polymerization process for homo- or copolymerization of olefins using that catalyst precursor.

SUMMARY OF THE INVENTION

According to the present invention, a catalyst precursor is provided comprising a metallocene compound, a magnesium containing compound and a thermoplastic polymer as a support, optionally further comprising an aluminium containing compound, and/or a metal alkoxy compound, and/or a silicon containing compound, and/or an alcohol.

The polymer particles used in catalyst preparation have a mean particle diameter of 5 to 200 $\mu$m and a pore volume of at least 0.05 cm$^3$/g and a pore diameter of at least from 100 to 3000 Å, preferably from 200 to 1000 Å and a surface area of from 0.1 m$^2$/g to 25 m$^2$/g, preferably from 0.2 m$^2$/g to 10 m$^2$/g.

The catalyst component, when used in conjunction with an organoaluminum compound or a mixture of organoaluminum compounds, can be used for olefin polymerization to produce linear low, medium and high density polyethylenes and copolymers of ethylene with alpha-olefins having about 3 to 18 carbon atoms.

DETAILED DESCRIPTION OF THE INVENTION

At least one metallocene compound is used for the preparation of the catalyst precursor of the present invention. The metallocenes used can be represented by the general formula $(Cp)_zMR_wX_y$, wherein Cp represents an unsubsituted or substituted cyclopentadienyl ring, M represents a Group IVB or VB transition metal, R represents a hydrocarbyl radical, such as alkyl, with 1 to 20 carbon atoms, such as methyl, ethyl or propyl, X represents a halogen atom, wherein $1 \leq z \leq 3$, $0 \leq w \leq 3$, $0 \leq y \leq 3$. The cyclopentadienyl ring may be unsubstituted or subsituted with a hydrocarbyl radical such as alkyl, alkenyl, aryl containing 1 to 20 carbon atoms, such as methyl, ethyl, propyl, amyl, isoamyl, isobutyl, phenyl and the like. The preferable transition metals are titanium, zirconium or vanadium.

Preferable examples of the above mentioned metallocene compounds include the following; bis(cyclopentadienyl) vanadium dimethyl, bis(cyclopentadienyl)vanadium methyl chloride, bis(cyclopentadienyl)vanadium ethyl chloride, bis (cyclopentadienyl)vanadium dichloride and cyclopentadienyltitanium trichloride, bis(cyclopentadienyl)titanium dichloride, bis(cyclopentadienyl)zirconium dichloride, cyclopentadienylzirconium trichloride, or bis (cyclopentadienyl)hafnium dichloride.

The magnesium compound used for the catalyst precursor synthesis of the invention includes Grignard compounds represented by the general formula R$^1$MgX, wherein R$^1$ is a hydrocarbon group of 1 to 20 carbon atoms and X is a halogen atom; preferably chlorine. Other preferable magnesium compounds are represented by the general formula R$^2$R$^3$Mg, wherein R$^2$ and R$^3$ are each a hydrocarbon group of 1 to 20 carbon atoms.

Preferable examples of the above mentioned magnesium compounds include the following: dialkylmagnesium such as diethylmagnesium, dipropylmagnesium, di-isoproylmagnesium, di-n-butylmagnesium, di-isobutylmagnesium butylethylmagnesium, dihexylmagnesium, dioctylmagnesium, butyloctylmagnesium; alkyl magnesium chloride such as ethylmagnesium chloride, butylmagnesium chloride, hexylmagnesium chloride and the like.

The metal alkoxy compound used for the catalyst precursor synthesis of-this invention can be represented by the general formula M(OR)$_n$, in which M is a transition metal like titanium, zirconium, vanadium, hafnium, etc. R is an alkyl group or any hydrocarbon which contains 1 to 20 carbon atoms. Whilst, n is the number of the alkoxy groups depending on the oxidation number of the used metal.

The metal alxkoxy compound can be also represented by the general formula M(OR)$_a$X$_b$, wherein R represents a hydrocarbon residue having 1 to 20 carbon atoms, M is a transition metal, X represents a halogen atom and a and b represent a number satisfying $1 \leq a \leq 4$, $0 \leq b \leq 3$ and a+b=4 in case of a tetravalance metal.

Preferable examples of the above mentioned metal alkoxy compounds include the following; tetramethoxy titanium, tetraethoxy titanium, tetrapropoxy titanium, tetrabutoxy titanium, tetraisobutoxy titanium, tetrapentoxy titanium, trimethoxy chloro titanium, diethoxydichloro titanium, trichloroethoxy titanium, tetramethoxy zirconium, tetraethoxy zirconium, tetrabutoxy zirconium, tetraisobutoxy zirconium, trimethoxychloro titanium, or mixtures thereof The silicon compound used in the present invention can be represented by the general formula SiX$_4$ or SiR$_a$X$_b$ wherein R represents a hydrocarbon residue having 1 to 20 carbon atoms, X represents a halogen atom and a and b represent a number satisfying $0 \leq a \leq 4$, $0 \leq b \leq 4$ and a+b=4.

Preferable examples of the above mentioned silicon compounds include the following: silicon tetrachloride, trichloro methyl silane, dichloro dimethyl silane, trimethyl chloro silane, tetramethyl silane, trichloro ethyl silane, etc.

The alcohol may be represented by the general formula ROH, wherein R represents a hydrocarbon group having 1 to 20 carbon atoms such as methylalcohol, ethylalcohol, propylalcohol, isopropylalcohol, or mixtures thereof.

The catalyst precursors of the present invention are preferably synthesized with aluminoxane represented by the general formula R$^5$R$^6$Al—O—AlR$^7$R$^8$, where R$^5$, R$^6$, R$^7$ and R$^8$ are either the same or different linear, branched or cyclic alkyl group of 1 to 12 carbons, such as methyl, ethyl, propyl or isobutyl. The preferred examples are methylaluminoxane and modified methylaluminoxane (MMAO) or a mixture of aluminium alkyls and MAO. The [Al]:[V] molar ratio in the final catalyst precursor solid usually ranges from 0.5:1 up to 200:1, most preferably from 2:1 to 50:1. Also, the [Al]:[Ti] molar ratio in the final catalyst precursor usually ranges from 0.5:1 up to 200:1, preferably from 2:1 to 50:1.

The aluminium compound used for the catalyst precursor synthesis of the invention may also be suitably synthesized with an organoaluminum compound represented by the general formula $R^4{}_nAlX_{3-n}$, wherein $R^4$ represents a hydrocarbon group having 1 to 10 carbon atoms; X represents a halogen atom or an alkoxy group and n represents a number satisfying $0 \leq n \leq 3$. Illustrative but not limiting examples include trialkylaluminums such as trimethylaluminum, triethylaluminum, triisobutylaluminum, tri-n-hexylaluminum; dialkylaluminum chloride such as dimethylaluminum chloride, diethylaluminum chloride; alkylaluminum dichloride such as methylaluminum dichloride, ethylaluminum dichloride; dialkylaluminum methoxide such as dimethylaluminum methoxide, diethylaluminum ethoxide. The prefered activators of the above general formula are trimethylaluminum, triethylaluminum, triisobutylaluminum and tri-n-hexylaluminum.

The polymer particles used in the present invention are in the form of distinct spherical particles, on which the active catalyst component is chemically bonded, wherein the ratio of active catalyst component to polymeric support is less than 2% by weight.

In contrast, metallocene catalysts supported on silica either relied on physical impregnation of the catalyst active sites on the support or a bonding that readily allows the catalyst precursor active sites on the support to be extracted (leached) resulting in fines generation and producing polymers of poor morphology.

The polymer particles used in the present invention have a perfect spherical shape with a mean particle diameter of 5 to 200 $\mu$m, a pore volume of at least 0.05 cm$^3$/g, a pore diameter of at least from 100 to 3000 Å, preferably from 200 to 900 Å and a surface area of from 0.1 m$^2$/g to 25 m$^2$/g, preferably from 0.2 m$^2$/g to 10 m$^2$/g.

Examples of the polymeric supports used in the catalyst precursor preparation of the present invention include thermoplastic polymers such as polyolefin, polyvinylchloride, polyvinylalcohol or polycarbonate, preferably polyvinylchloride.

The polymer particles used in the present invention have surface active sites such as labile chlorine atoms. Preferably, these active sites are reacted stoichiometrically with the organometallic compound, namely a magnesium containing compound.

The use of the polymer particles mentioned in this invention which are used in catalyst precursor preparation offer significant advantages over traditional olefin polymerization catalysts using supports such as silica or magnesium chloride. In comparison to the silica supported catalyst, the polymer particles described in catalyst precursors preparation of the present invention do not require high temperature and prolonged dehydration steps prior to their use in catalyst precursor synthesis, thereby simplifying the synthesis process and thus reducing the overall cost of catalyst preparation. Furthermore, the cost of the polymeric support used in the present invention is substantially cheaper than silica or magnesium chloride supports. In addition, unlike in the preparation of silica supported metallocene catalysts, the preparation of the catalyst precursor of the present invention may be done with or without an organoaluminum compounds.

The synthesis of the solid catalyst component of the present invention involves introducing the polymeric material described above into a vessel and then adding a diluent. Suitable diluents include isopentane, hexane, cyclohexane, heptane, isooctane and pentamethylheptane or ethers such as diethylether, methyltertiarybutylether, dibutylether, etc. The polymeric material is then treated with a magnesium compound described above at a temperature in the range of about 20° C. to 110° C. The ratio of magnesium compound to polymer support can be in the range of 0.05 mmol to 20 mmol per gram polymer, preferably, 0.1 to 10 mmol per gram polymer, and more preferably 0.2 mmol to 2 mmol per gram polymer. The solvent is then vaporised using a nitrogen purge at a temperature in the range of about 20° C. to 80° C., or the following step of adding the metallocene precursor can follow without removing the solvent.

The resulting free flowing solid product is then slurried. Suitable solvents for slurrying include hexane, cyclohexane, heptane, isooctane and pentamethylheptane. The magnesium modified polymeric material is then treated with a metallocene compound described above at a temperature in the range of about 20° C. to 120° C. Afterwards an aluminium-containing compound can be added and mixed with catalyst precursor mixture for 15 minutes only. The produced solid catalyst precursor component is then washed with a suitable solvent such as isopentane, hexane, cyclohexane, heptane, isooctane and pentamethylheptane. The solid catalyst component is then dried using a nitrogen purge at a temperature in the range of 20 to 100° C., preferably 30° C. to 80° C.

The catalyst precursor composition of this invention is not subjected to halogenation. e.g., chlorination treatments. The thus-formed catalyst precursor component is activated with suitable activators, also known as co-catalysts or catalyst promoters for olefin polymerization. The preferred compounds for activation of the solid catalyst component are organoaluminum compounds or boranes.

The catalyst precursor can be suitably activated by organoaluminum compounds represented by the general formula $R^4{}_nAlX_{3-n}$, wherein $R^4$ represents a hydrocarbon group having 1 to 10 carbon atoms; X represents a halogen atom or an alkoxy group and n represents a number satisfying $0 \leq n \leq 3$. Illustrative but not limiting examples include trialkylaluminums such as trimethylaluminum, triethylaluminum, triisobutylaluminum, tri-n-hexylaluminum; dialkylaluminum chloride such as dimethylaluminum chloride, diethylaluminum chloride; alkylaluminum dichloride such as methylaluminum dichloride, ethylaluminum dichloride; dialkylaluminum methoxide such as dimethylaluminum methoxide, diethylaluminum ethoxide. The preferred activators of the above general formula are trimethylaluminum, triethylaluminum, triisobutylaluminum and tri-n-hexylaluminum. The catalyst of the present invention may also be suitably activated with an aluminoxane represented by the general formula $R^5R^6Al-O-AlR^7R^8$, where $R^5$, $R^6$, $R^7$ and $R^8$ are either the same or different linear, branched or cyclic alkyl group of 1 to 12 carbons; such as methyl, ethyl, propyl or isobutyl. The preferred examples are methylaluminoxane and modified methylaluminoxane (MMAO).

Mixtures of alkylaluminum compounds and aluminoxane compounds described above can also be conveniently used for catalyst activation. The alkylaluminum compound or aluminoxane compounds of this invention can be used in the range of about 1 to 3000 moles of aluminum per one mole of transition metal in said catalyst precursor, and more preferably in the range of about 50 to 1500 moles per one mole of transition metal.

The catalyst system comprising the catalyst precursor described in the present invention and a cocatalyst can be used in polymerizing alpha-olefins in slurry and gas phase processes. Gas phase polymerization can be carried out in stirred bed reactors and in fluidized bed reactors. A pressure in the range of 5 to 40 bar is suitable for the polymerization, preferably 10 to 35 bar. Suitable polymerization temperatures are in the range of 30° C. to 110° C., preferably 50° C. to 95° C. In addition to polyethylene homopolymer, ethylene copolymers with $C_3$–$C_{10}$ alpha-olefins are readily prepared by the present invention.

The olefins may therefore be selected from the group comprising ethylene, propylene, 1-butene, 1-pentene, 1-hexene, 1-heptene, 1-octene, or 4-methyl-1-pentene.

The polymer particles produced in the process of the present invention are spherical in shape and have an average diameter ranging between 600–800 microns and a mean bulk density ranging between 0.3–0.45 g/cm³.

Additional features and advantages of the present invention are illustrated in the following examples and in the drawings.

EXAMPLES

Figure 1:
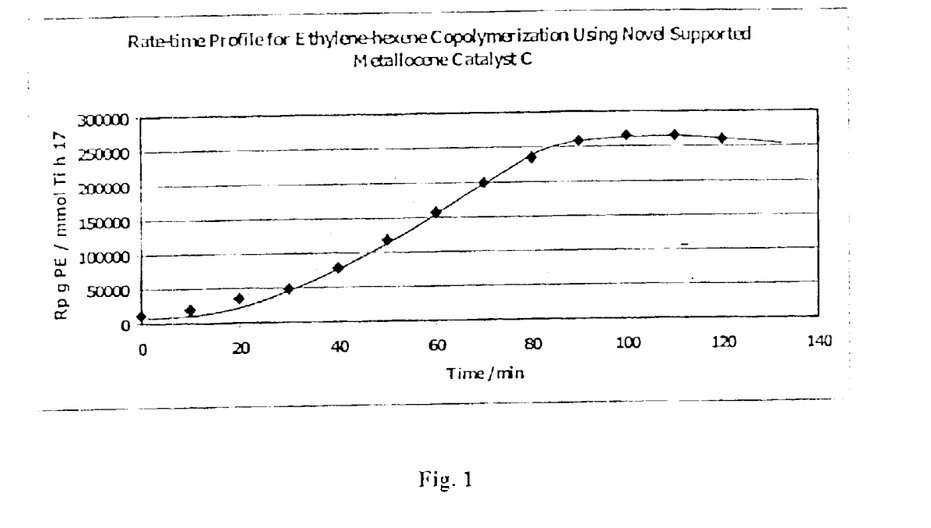
FIG. 1 Kinetic rate-time profile for ethylene hexene copolymerization using catalyst precursor F of the present invention ($CpTiCl_3$). The profile shows a slow rate build up with continuous increase resulting in excellent polymer morphology.
Figure 2:
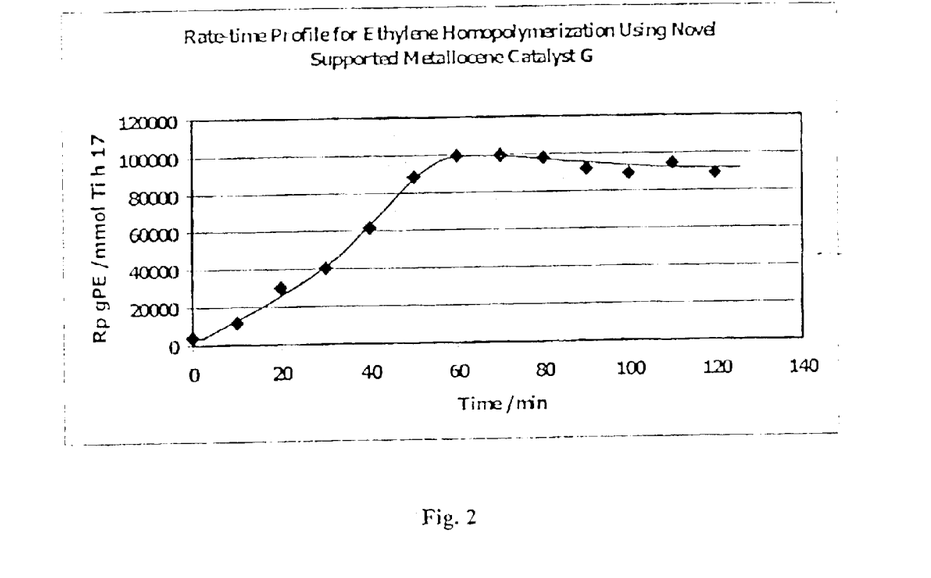
FIG. 2 Kinetic rate-time profile for ethylene polymerization using catalyst precursor G of the present invention ($Cp_2VCl_2$). Similarly, the profile shows a slow rate build up with continuous increase resulting in excellent polymer morphology.
Figure 3:
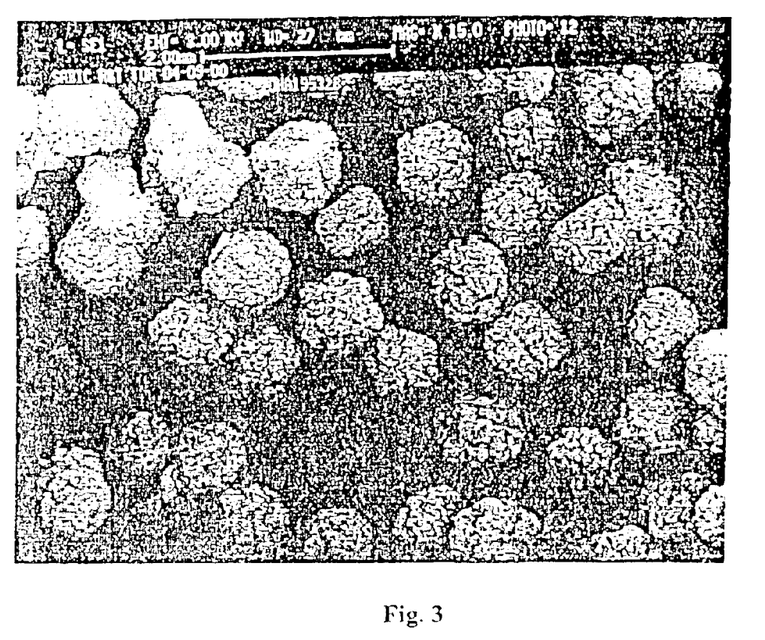
FIG. 3 and FIG. 4 are both SEM micrographs showing a general view of the superior spherical morphology of typical samples from polyethylene polymer and copolymers produced by the novel supported metallocene catalyst precursor of the present invention.
Figure 4:
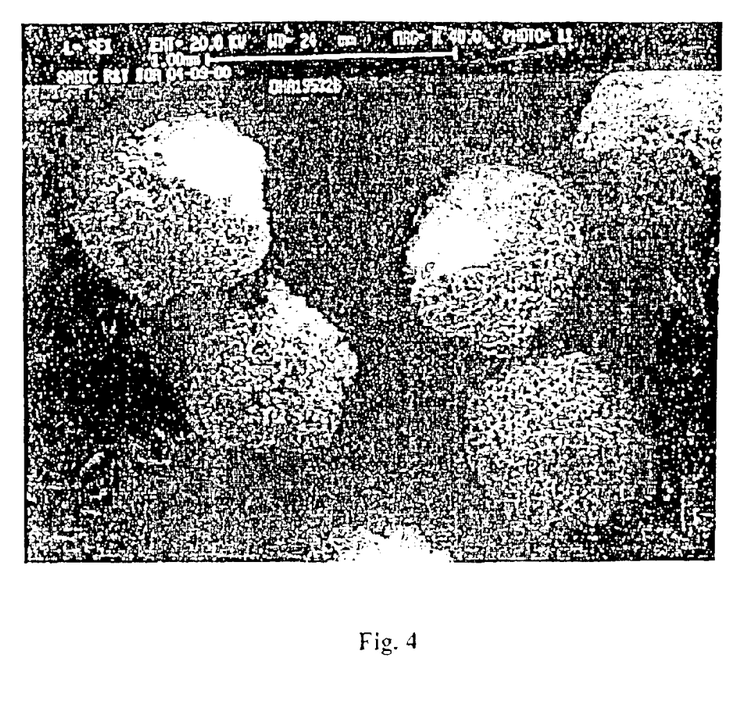
Figure 5:
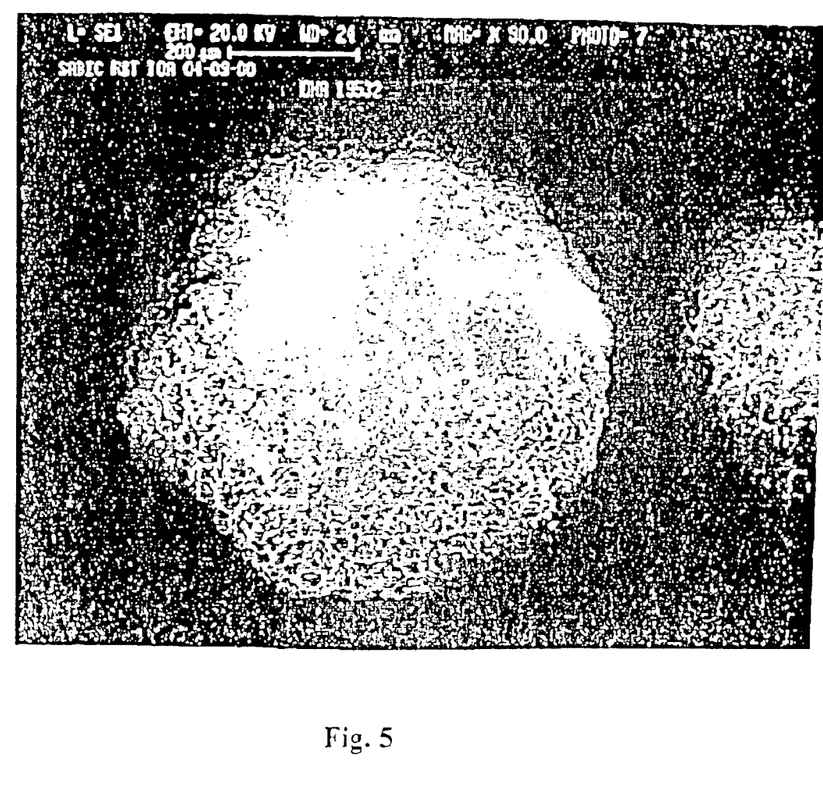
FIG. 5 is a SEM micrograph showing a closer view of a single polyethylene polymer particle produced by the catalyst precursor of the present invention. The close up shows almost a perfect spherical morphology with smooth surface.

The following examples are intended to be illustrative for this invention. They are, of course, not to be taken in any way limiting on the scope of this invention. Numerous changes and modifications can be made with respect to the invention.

Example 1

Synthesis of Catalyst Precursor A

To a three-necked round bottom flask, equipped with a condenser and stirrer, 9.0 g of polyvinylchloride spheres of 79 um average particle size were placed (supplied by SABIC, Saudi Arabia). The flask containing the polyvinylchloride was heated up to 75° C. using an oil bath and then evacuated at 30 mm Hg pressure for 30 minutes. The flask and its contents were then purged with dried nitrogen and the polyvinylchloride was slurried using 30 cm³ of methyltertiarybutylether (MTBE) at 40° C. Then 2 cm³ of butylmagnesium chloride (supplied by Aldrich, 2.0 molar in diethylether) was added to the slurry and the resultant mixture was stirred for 30 minutes at 45° C. under reflux conditions. The MTBE was evaporated to obtain a free flowing powder by using a nitrogen purge heated to 50° C. Then the modified polyvinylchloride was slurried using a $CpTiCl_3$ solution (0.11 g of $CpTiCl_3$ in 20 cm³ toluene), and the resulting mixture was stirred at 65° C. for 60 minutes.

The supernatant liquid was decanted and the resulting solid product was washed by stirring with 50 cm³ of n-hexane and then removing the n-hexane. Finally, the solid catalyst was dried using a nitrogen purge at 60° C. to yield a free-flowing pale brown colored solid product.

The solid catalyst component was analyzed by atomic adsorption spectroscopy and was found to contain 0.17% by weight of titanium atoms and 1.62% by weight of magnesium atoms.

Example 2

Ethylene Hompolymerization

An autoclave with a volume of 2 liters was purged with nitrogen at 130° C. for 30 minutes. After cooling the autoclave to 80° C., one liter of n-hexane was introduced to the reactor, then the reactor was pressurized with 15 bar of ethylene. Then 3.5 cm³ of M-MAO solution Type 3A by Akzo-Nobel (7 wt % Al) was injected into the reactor by means of a catalyst injection pump.

This was followed by injection of 0.15 g of the solid catalyst precursor A described in Example 1 after being slurried in 20 cm³ of n-hexane solvent. The reactor temperature was raised to 85° C. Ethylene polymerization was carried out for 60 minutes; with ethylene supplied on demand to maintain the total reactor pressure at 15 bar. 331 liters of ethylene were consumed and 471.5 grams of polyethylene were recovered. That translates into an activity of 88,628 g PE/mmol Ti h at 216 psi, and a catalyst productivity of 3,140 kg PE/kg cat h.

The polyethylene was examined by GPC and was found to have a weight average molecular weight of 224,894, a number average molecular weight of 84,181 and a narrow molecular weight distribution of 2.6. The bulk density of the produced PE resin was found to be 0.285 g/cm³. The Low Melt Index ($MI_2$) was measured at 0.09 dg/min and the density was 0.948 g/cm³.

Example 3

Synthesis of Catalyst Precursor B

To a three-necked round bottom flask, equipped with a condenser and stirrer, 9.0 g of polyvinylchloride spheres of 36 um average particle size were placed. The flask containing the polyvinylchloride was heated up to 75° C. using an oil bath and then evacuated at 30 mm Hg pressure for 30 minutes.

The flask and its contents were then purged with dried nitrogen and the polyvinylchloride was slurried using 30 cm³ of isopentane at 30° C. Then 2.5 cm³ of butylmagnesium chloride (supplied by Aldrich, 2.0 molar in diethylether) was added to the slurry and the resultant mixture was stirred for 30 minutes at 40° C. under reflux conditions. The isopentane was evaporated to obtain a free flowing white powder by using a nitrogen purge heated to 55° C. Then the modified polyvinylchloride was slurried using a $CpTiCl_3$ solution (0.1 g of $CpTiCl_3$ in 20 cm³ toluene), and the resulting mixture was stirred at 65° C. for 60 minutes. The supernatant liquid was decanted and the resulting solid product was washed by stirring with 50 cm³ of n-hexane and then removing the n-hexane. Finally, the solid catalyst was dried using a nitrogen purge at 60° C. to yield a free-flowing pale brown colored solid product.

The solid catalyst component was analyzed by atomic adsorption spectroscopy and was found to contain 0.16% by weight of titanium atoms and 1.25% by weight of magnesium atoms.

Example 4

Ethylene Hompolymerization

An autoclave with a volume of 2 liters was purged with nitrogen at 130° C. for 30 minutes. After cooling the autoclave to 80° C., one liter of n-hexane was introduced to the reactor, then the reactor was pressurized with 3 bar of hydrogen first, then followed by 12 bar of ethylene. Then a mixture of 3.5 cm$^3$ of M-MAO solution Type 3A by Akzo-Nobel (7 wt % Al) and 2 cm$^3$ of TNHAL (2 molar solu.) was injected into the reactor by means of a catalyst injection pump. This was followed by injection of 0.1 g of the solid catalyst precursor B described in Example 2 after being slurried in 20 cm$^3$ of n-hexane solvent. The reactor temperature was raised to 85° C. Ethylene polymerization was carried out for 60 minutes; with ethylene supplied on demand to maintain the total reactor pressure at 15 bar. 533 liters of ethylene were consumed and 581 grams of polyethylene were recovered. That translates into an activity of 173,952 g PE/mmol Ti h at 176 psi, and a catalyst productivity of 5,810 kg PE/kg cat h.

The polyethylene was examined by GPC and was found to have a weight average molecular weight of 242,744, a number average molecular weight of 92,085 and a broad molecular weight distribution of 2.6. The bulk density of the produced PE resin was found to be 0.343 g/cm$^3$. The Low Melt Index (MI$_2$) was measured at 0.08 dg/min and the density was 0.951.

Example 5

Synthesis of Catalyst Precursor C

To a three-necked round bottom flask, equipped with a condenser and stirrer, 9.0 g of spherical polyvinylchloride spheres of 32 um average particle size were placed. The flask containing the polyvinylchloride was heated up to 75° C. using an oil bath and then evacuated at 30 mm Hg pressure for 30 minutes. The flask and its contents were then purged with dried nitrogen and the polyvinylchloride was slurried using 30 cm$^3$ of isopentane at 30° C.

Then 2.5 cm$^3$ of butylmagnesium chloride (supplied by Aldrich, 2.0 molar in diethylether) was added to the slurry and the resultant mixture was stirred for 30 minutes at 40° C. under reflux conditions. The isopentane was evaporated to obtain a free flowing powder by using a nitrogen purge heating at 55° C. Then the modified polyvinylchloride was slurried using a CpTiCl$_3$ solution (0.07 g of CpTiCl$_3$ in 10 cm$^3$ toluene+10 cm$^3$ iso-octane), and the resulting mixture was stirred at 65° C. for 60 minutes. The supernatant liquid was decanted and the resulting solid product was washed by stirring with 50 cm$^3$ of n-hexane and then removing the n-hexane. Finally, the solid catalyst was dried using a nitrogen purge at 60° C. to yield a free-flowing pale brown colored solid product.

The solid catalyst component was analyzed by atomic adsorption spectroscopy and was found to contain 0.12% by weight of titanium atoms and 1.2% by weight of magnesium atoms.

Example 6

Ethylenehexene Copolymerization

An autoclave with a volume of 2 liters was purged with nitrogen at 130° C. for 30 minutes. After cooling the autoclave to 80° C., one liter of n-hexane was introduced to the reactor, then 20 cm of 1-hexene comonomer was introduced to the reactor.

Afterwards the reactor was pressurized with 3 bar of hydrogen, then followed by 12 bar of ethylene. Then a mixture of 2 cm$^3$ of M-MAO solution Type 3A by Akzo-Nobel (7 wt % Al) and 2 cm$^3$ of TNHAL (2 Molar solution in heptane) was injected into the reactor by means of a catalyst injection pump. This was followed by injection of 0.1 g of the solid catalyst precursor C described in Example 2 after being slurried in 20 cm$^3$ of n-hexane solvent.

The reactor temperature was raised to 85° C. Ethylene polymerization was carried out for 60 minutes; with ethylene supplied on demand to maintain the total reactor pressure at 15 bar. 431 liters of ethylene were consumed and 473 grams of polyethylene were recovered. That translates into an activity of 189,200 g PE/mmol Ti h at 176 psi, and a catalyst productivity of 4,730 kg PE/kg cat h.

The polyethylene was examined by GPC and was found to have a weight average molecular weight of 258,975, a number average molecular weight of 103,778 and a broad molecular weight distribution of 2.76. The bulk density of the produced PE resin was found to be 0.325 g/cm$^3$. The Low Melt Index (MI$_5$) was measured at 0.07 dg/min and the density was 0.932 g/cm$^3$.

Example 7

Synthesis of Catalyst Precursor D

To a three-necked round bottom flask, equipped with a condenser and stirrer, 9.0 g of polyvinylchloride (outside source) spheres of 36 um average particle size were placed. The flask containing the polyvinylchloride was heated up to 75° C. using an oil bath and then evacuated at 30 mm Hg pressure for 30 minutes.

The flask and its content were then purged with dried nitrogen and the polyvinylchloride was slurried using 30 cm$^3$ of isopentane at 30° C. Then 2.0 cm$^3$ of butylmagnesium chloride (supplied by Aldrich, 2.0 molar in diethylether) was added to the slurry arid the resultant mixture was stirred for 30 minutes at 25° C. under reflux conditions. The isopentane was evaporated to obtain a free flowing white powder by using a nitrogen purge heating at 55° C. Then the modified polyvinylchloride was slurried using a CpTiCl$_3$ solution (0.07 g of CpTiCl$_3$ in 10 cm$^3$ toluene+10 cm$^3$ iso-octane), and the resulting mixture was stirred at 65° C. for 60 minutes. After which 1 cm$^3$ of modified methylaluminoxane (M-MAO type 3A) supplied by Akzo Nobel was added to the catalyst mixture and allowed to stir for 15 minutes only.

The supernatant liquid was decanted and the resulting solid product was washed by stirring with 50 cm$^3$ of isopentane and then removing the isopentane. Finally, the solid catalyst was dried using a nitrogen purge at 60° C. to yield a free-flowing pale brown colored solid product.

The solid catalyst component was analyzed by atomic adsorption spectroscopy and was found to contain 0.11% by weight of titanium atoms and 1.2% by weight of magnesium atoms and 0.31% by weight of aluminium. [Al]:[Ti] molar ratio=5.4:1.

Example 8

Ethylene Hexene Co-polymerization

An autoclave with a volume of 2 liters was purged with nitrogen at 130 C for 30 minutes. After cooling the autoclave to 80° C., one liter of n-hexane was introduced into the reactor, followed by 20 cm of 1-hexene comonomer.

Afterwards the reactor was pressurized with 3.5 bar of hydrogen, then followed by 11.5 bar of ethylene. Then a mixture of 3 cm$^3$ of M-MAO solution Type 3A by Akzo-Nobel (7 wt % Al) and 3 cm$^3$ of TEAL (1 molar solution in hexane) was injected into the reactor by means of a catalyst injection pump. This was followed by the injection of 0.1 g of the solid catalyst precursor D described in Example 7 after being slurried in 20 cm$^3$ of n-hexane solvent.

The reactor temperature was raised to 87° C. Ethylene polymerization was carried out for 60 minutes; with ethylene supplied on demand to maintain the total reactor pressure at 15 bar. 237 liters of ethylene were consumed and 327 grams of polyethylene were recovered. That translates into an activity of 142,393 g PE/mmol Ti h at 176 psi, and a catalyst productivity of 3,270 kg PE/kg cat h.

The polyethylene was examined by GPC and was found to have a weight average molecular weight of 133,203, a number average molecular weight of 47,343 and a broad molecular weight distribution of 2.8. The bulk density of the produced PE resin was found to be 0.311 g/cm$^3$. The Low Melt Index (MI$_5$) was measured at 0.85 dg/min and the density was 0.932 g/cm$^3$.

Example 9

Ethylene Polymerization

An autoclave with a volume of 2 liters was purged with nitrogen at 130° C. for 30 minutes. After cooling the autoclave to 80° C., one liter of n-hexane was introduced to the reactor, then the reactor was pressurized with 3.5 bar of hydrogen first, then followed by 11.5 bar of ethylene. Afterwards, 5.5 cm$^3$ of M-MAO solution Type 3A by Akzo-Nobel (7 wt % Al) was injected into the reactor by means of a catalyst injection pump. This was followed by injection of 0.1 g of the solid catalyst precursor D described in Example 2 after being slurried in 20 cm$^3$ of n-hexane solvent. The reactor temperature was raised to 88° C.

Ethylene polymerization was carried out for 60 minutes; with ethylene supplied on demand to maintain the total reactor pressure at 15 bar. 379 liters of ethylene were consumed and 515.5 grams of polyethylene were recovered. That translates into an activity of 173,952 g PE/mmol Ti h at 176 psi, and a catalyst productivity of 5,150 kg PE/kg cat h.

The polyethylene was examined by GPC and was found to have a weight average molecular weight of 121,993, a number average molecular weight of 39,745 and a broad molecular weight distribution of 3.0. The bulk density of the produced PE resin was found to be 0.355 g/cm$^3$. The Low Melt Index (MI$_{2.16}$) was measured at 1.1 dg/min and the density was 0.949 g/cm$^3$.

Example 10

Synthesis of Catalyst Precursor E

To a three-necked round bottom flask, equipped with a condenser and stirrer, 9.0 g of polyvinylchloride (outside source) spheres of 36 um average particle size were placed. The flask containing the polyvinylchloride was heated up to 75° C. using an oil bath and then evacuated at 30 mm Hg pressure for 30 minutes. The flask and its content were then purged with dried nitrogen and the polyvinylchloride was slurried using 30 cm$^3$ of isopentane at 30° C. Then 2.0 cm$^3$ of butylmagnesium chloride (supplied by Aldrich, 2.0 molar in diethylether) was added to the slurry and the resultant mixture was stirred for 30 minutes at 25° C. under reflux conditions. The isopentane was evaporated to obtain a free flowing white powder by using a nitrogen purge heating at 55° C. Then the modified polyvinylchloride was slurried using a CpTiCl$_3$ solution (0.07 g of CpTiCl$_3$ in 10 cm$^3$ toluene+10 cm$^3$ iso-octane), and the resulting mixture was stirred at 65° C. for 60 minutes. After which 1.5 cm$^3$ of modified methylaluminoxane (M-MAO type 3A) supplied by Akzo Nobel was added to the catalyst mixture and allowed to stir for 15 minutes only. The supernatant liquid was decanted and the resulting solid product was washed by stirring with 50 cm$^3$ of isopentane and then removing the isopentane. Finally, the solid catalyst was dried using a nitrogen purge at 60° C. to yield a free-flowing pale brown colored solid product.

The solid catalyst component was analyzed by atomic adsorption spectroscopy and was found to contain 0.11% by weight of titanium atoms and 0.95% by weight of magnesium atoms and 0.39% by weight of aluminium. [Al]:[Ti] molar ratio=7:1.

Example 11

Ethylene Hexene Copolymerization

An autoclave with a volume of 2 liters was purged with nitrogen at 130° C. for 30 minutes. After cooling the autoclave to 80° C., one liter of n-hexane was introduced into the reactor, followed by 20 cm of 1-hexene comonomer.

Afterwards the reactor was pressurized with 3.5 bar of hydrogen, then followed by 11.5 bar of ethylene. Then a mixture of 3.5 cm$^3$ of M-MAO solution Type 3A by Akzo-Nobel (7 wt % Al) was injected into the reactor by means of a catalyst injection pump. This was followed by the injection of 0.1 g of the solid catalyst precursor E described in Example 10 after being slurried in 20 cm$^3$ of n-hexane solvent. The reactor temperature was raised to 87° C. Ethylene polymerization was carried out for 60 minutes; with ethylene supplied on demand to maintain the total reactor pressure at 15 bar. 217 liters of ethylene were consumed and 261 grams of polyethylene were recovered. That translates into an activity of 130,500 g PE/mmol Ti h at 176 psi, and a catalyst productivity of 2,610 kg PE/kg cat h.

The polyethylene was examined by GPC and was found to have a weight average molecular weight of 116,576, a number average molecular weight of 32,480 and a broad molecular weight distribution of 3.5.

The bulk density of the produced PE resin was found to be 0.301 g/cm$^3$. The Low Melt Index (MI$_{2.16}$) was measured at 1.5 dg/min and the density was 0.929 g/cm$^3$.

Example 12

Synthesis of Catalyst Precursor F

To a three-necked round bottom flask, equipped with a condenser and stirrer, 9.0 g of polyvinylchloride (outside source) spheres of 36 um average particle size were placed. The flask containing the polyvinylchloride was heated up to 75° C. using an oil bath and then evacuated at 30 mm Hg pressure for 30 minutes. The flask and its content were then purged with dried nitrogen and the polyvinylchloride was slurried using 30 cm$^3$ of isopentane at 30° C. Then 2.0 cm$^3$ of butylmagnesium chloride (supplied by Aldrich, 2.0 molar in diethylether) was added to the slurry and the resultant mixture was stirred for 20 minutes at 25° C., under reflux conditions. After which 0.1 cm³ of tetraethoxy titanium (1 molar solution in n-hexane) was added to the catalyst-mixture via syringe under continuous stirring and was allowed to mix for another 15 minutes. The isopentane was evaporated to obtain a free flowing yellowish or beige powder by using a nitrogen purge heating at 55° C. Then the modified polyvinylchloride was slurried using a CpTiCl₃ solution (0.075 g of CpTiCl₃ in 25 cm³ toluene), and the resulting mixture was stirred at 55° C. for 60 minutes. After which 0.75 cm³ of modified methylaluminoxane (M-MAO type 3A) supplied by Akzo Nobel was added to the catalyst mixture and allowed to stir for 15 minutes only. The supernatant liquid was decanted and the resulting solid product was washed by stirring with 50 cm³ of isopentane and then removing the isopentane. Finally, the solid catalyst was dried using a nitrogen purge at 60° C. to yield a free-flowing pale brown colored solid product.

The solid catalyst component was analyzed by atomic adsorption spectroscopy and was found to contain 0.14% by weight of titanium atoms and 0.95% by weight of magnesium atoms and 0.25% by weight of aluminium. [Al]:[Ti] molar ratio=3:1.

Example 13

Ethylene hexene-Copolymerization

An autoclave with a volume of 3 liters was purged with nitrogen at 130° C. for 30 minutes. After cooling the autoclave to 80° C., one and a half liter of n-hexane was introduced into the reactor, followed by 20 cm of 1-hexene comonomer.

Afterwards the reactor was pressurized with 3.0 bar of hydrogen, then followed by 12 bar of ethylene. Then of 4.5 cm³ of M-MAO solution Type 3A by Akzo-Nobel (7 wt % Al) was injected into the reactor by means of a catalyst injection pump. This was followed by the injection of 0.1 g of the solid catalyst precursor F described in Example 12 after being slurried in 20 cm³ of n-hexane solvent. The reactor temperature was raised to 85° C. Ethylene polymerization was carried out for 60 minutes; with ethylene supplied on demand to maintain the total reactor pressure at 15 bar. 351 liters of ethylene were consumed and 425.7 grams of polyethylene were recovered. That translates into an activity of 141,799 g PE/mmol Ti h at 176 psi, and a catalyst productivity of 4,257 kg PE/kg cat h.

The polyethylene was examined by GPC and was found to have a weight average molecular weight of 176,576, a number average molecular weight of 60,111 and a broad molecular weight distribution of 2.9. The bulk density of the produced PE resin was found to be 0.331 g/cm³. The Low Melt Index ($MI_{2.16}$) was measured at 0.25 dg/min and the density was 0.939 g/cm³.

Example 14

Synthesis of Catalyst Precursor G

To a 100 ml three-necked round bottom flask, equipped with a condenser and stirrer, 9.5 g of polyvinylchloride (outside source) spheres of 36 urn average particle size were placed. The flask containing the polyvinylchloride was heated up to 71° C., using an oil bath and then evacuated at 30 mm Hg pressure for 30 minutes. The flask and its content were then purged with dried nitrogen and the polyvinylchloride was slurried using 30 cm³ of isopentane at 30° C.

Then 2.0 cm³ of butylmagnesium chloride (supplied by Aldrich, 2.0 molar in diethylether) was added to the slurry and the resultant mixture was stirred for 25 minutes at 25° C., under reflux conditions. After which 0.1 cm³ of tetraethoxy titanium (1 molar solution in n-hexane) was added to the catalyst mixture via syringe under continuous stirring and was allowed to mix for another 15 minutes. The isopentane was evaporated to obtain a free flowing yellowish or beige powder by using a nitrogen purge heating at 55° C. Then the modified polyvinylchloride support was slurried using a Cp₂VCl₂ solution (0.085 g of Cp₂VCl₂ in 25 cm³ toluene) and the resulting mixture was stirred at 55° C. for 75 minutes. The supernatant liquid was decanted and the resulting solid product was washed by stirring with 50 cm³ of isopentane and then removing the isopentane. Finally, the solid catalyst was dried using a nitrogen purge at 60° C. to yield a free-flowing pale brown colored solid product.

The solid catalyst component was analyzed by atomic adsorption spectroscopy and was found to contain 0.097% by weight of vanadium atoms and 0.95% by weight of magnesium atoms and 0.02% by weight of titanium.

Example 15

Ethylene Polymerization

An autoclave with a volume of 2 liters was purged with nitrogen at 130° C. for 30 minutes. After cooling the autoclave to 80° C., one liter of n-hexane was introduced to the reactor, then the reactor was pressurized with 3.0 bar of hydrogen first, then followed by 12 bar of ethylene. Afterwards, 4.5 cm³ of M-MAO solution Type 3A by Akzo-Nobel (7 wt % Al) was injected into the reactor by means of a catalyst injection pump. This was followed by injection of 0.11 g of the solid catalyst precursor G described in Example 14 after being slurried in 20 cm³ of n-hexane solvent. The reactor temperature was raised to 86° C.

Ethylene polymerization was carried out for 70 minutes; with ethylene supplied on demand to maintain the total reactor pressure at 15 bar. 379 liters of ethylene were consumed and 411 grams of polyethylene were recovered. That translates into an activity of 169,525 g PE/mmol V h at 176 psi, and a catalyst productivity of 3,225 kg PE/kg cat h. The polyethylene was examined by GPC and was found to have a weight average molecular weight of 155,025, a number average molecular weight of 43,110 and a broad molecular weight distribution of 3.6. The bulk density of the produced PE resin was found to be 0.345 g/cm³. The Low Melt Index ($MI_{2.16}$) was measured at 0.8 dg/min and the density was 0.949 g/cm³.

Example 16

Synthesis of Catalyst Precursor H

To a 100 ml three-necked round bottom flask, equipped with a condenser and stirrer, 9.5 g of polyvinylchloride (outside source) spheres of 36 um average particle size were placed. The flask containing the polyvinylchloride was heated up to 71° C., using an oil bath and then evacuated at 30 mm Hg pressure for 30 minutes. The flask and its content were then purged with dried nitrogen and the polyvinylchloride was slurried using 30 cm³ of isopentane at 30° C. Then 2.5 cm³ of butylmagnesium chloride (supplied by Aldrich, 2.0 molar in diethylether) was added to the slurry and the resultant mixture was stirred for 25 minutes at 25° C., under reflux conditions. After which 0.11 cm³ of tetraethoxy titanium (1 molar solution in n-hexane) was added to the catalyst mixture via syringe under continuous stirring and was allowed to mix for another 15 minutes.

After which 0.5 cm³ of modified methylaluminoxane (M-MAO type 3A, 7% wt Al) supplied by Akzo Nobel was added to the catalyst mixture and allowed to stir for another 15 minutes only. The isopentane was evaporated to obtain a free flowing yellowish or beige powder by using a nitrogen purge heating at 55° C. Then the modified polyvinylchloride support was slurried using a $Cp_2VCl_2$ solution (0.085 g of $Cp_2VCl_2$ in 25 cm³ toluene), and the resulting mixture was stirred at 55° C. for 90 minutes. The supernatant liquid was decanted and the resulting solid product was washed by stirring with 50 cm³ of isopentane and then removing the isopentane. Finally, the solid catalyst was dried using a nitrogen purge at 60° C. to yield a free-flowing pale brown colored solid product.

The solid catalyst component was analyzed by atomic adsorption spectroscopy and was found to contain 0.092% by weight of vanadium atoms, 0.91% by weight of magnesium atoms, 0.249% by weight of aluminium atoms and 0.03% by weight of titanium atoms.

Example 17

Ethylene Polymerization

An autoclave with a volume of 2 liters was purged with nitrogen at 130° C. for 30 minutes. After cooling the autoclave to 80° C., one liter of n-hexane was introduced to the reactor, then the reactor was pressurized with 3.0 bar of hydrogen first, then followed by 12 bar of ethylene. Afterwards, 4 cm³ of M-MAO solution Type 3A by Akzo-Nobel (7 wt % Al) was injected into the reactor by means of a catalyst injection pump. This was followed by injection of 0.11 g of the solid catalyst precursor H described in Example 16 after being slurried in 20 cm³ of n-hexane solvent. The reactor temperature was raised to 86° C.

Ethylene polymerization was carried out for 70 minutes; with ethylene supplied on demand to maintain the total reactor pressure at 15 bar. 369 liters of ethylene were consumed and 417.9 grams of polyethylene were recovered. That translates into an activity of 185,700 g PE/mmol V h at 176 psi, and a catalyst productivity of 3,275 kg PE/kg cat h.

The polyethylene was examined by GPC and was found to have a weight average molecular weight of 159,280, a number average molecular weight of 44,268 and a broad molecular weight distribution of 3.6. The bulk density of the produced PE resin was found to be 0.327 g/cm³. The Low Melt Index ($MI_{2.16}$) was measured at 0.77 dg/min and the density was 0.943 g/cm³.

Example 18

Synthesis of Catalyst Precursor J

To a 100 ml three-necked round bottom flask, equipped with a condenser and stirrer, 9.5 g of polyvinylchloride spheres of 35 um average particle size were charged. The flask containing the polyvinylchloride was heated up to 71° C. using an oil bath and then evacuated at 30 mm Hg pressure for 30 minutes. The flask and its content were then purged with dried nitrogen and the polyvinylchloride was slurried using 40 cm³ of isopentane.

Then 2.5 cm³ of 2M butylmagnesium chloride was added to the slurry and the resultant mixture was stirred for 30 minutes at 25° C. The stirring was then stopped and the supernatant liquid was allowed to evaporate at 39° C. under continuous nitrogen purge.

The dry support was then stirred with 1.5 cm³ of 2 M solution of dimethyldichlorosilane in 30 cm3 isopentane for 20 minutes at 30° C. After which 0.5 cm³ of modified methylaluminoxane (M-MAO type 3A, 7% wt Al) supplied by Akzo Nobel was added to the catalyst mixture and allowed to stir for 10 minutes.

The stirring continued and isopentane solvent was allowed to evaporate at 39° C. under nitrogen purge until a white solid powder was produced. Then the solid product was stirred with vanadocene dichloride solution (0.08 g of $Cp_2VCl_2$ in 50 cm³ toluene) for 90 minutes at 75° C. The stirring was then stopped and the supernatant liquid was removed by cannula. The resulting solid was washed by stirring with 50 cm³ of isopentane. Finally, the solid catalyst was dried using a nitrogen purge for thirty minutes to yield a free-flowing white solid product.

The solid catalyst component was analyzed by atomic adsorption spectroscopy and was found to contain 0.1% by weight of vanadium atoms, 0.82% by weight of magnesium atoms, 0.11% by weight of silicon atoms and 0.12% by weight of aluminium atoms ([Al]:[V] molar ratio=2.2:1).

Example 19

Ethylene Polymerization

An autoclave with a volume of 2 liters was purged with nitrogen at 130° C. for 30 minutes. After cooling the autoclave to 80° C., one liter of n-hexane was introduced to the reactor, then the reactor was pressurized with 3.0 bar of hydrogen first, then followed by 12 bar of ethylene. Afterwards, 4 cm³ of M-MAO solution Type 3A by Akzo-Nobel (7 wt % Al) was injected into the reactor by means of a catalyst injection pump. This was followed by injection of 0.12 g of the solid catalyst precursor J described in Example 18 after being slurried in 20 cm³ of n-hexane solvent. The reactor temperature was raised to 86° C.

Ethylene polymerization was carried out for 70 minutes; with ethylene supplied on demand to maintain the total reactor pressure at 15 bar. 279 liters of ethylene were consumed and 315.5 grams of polyethylene were recovered. That translates into an activity of 134,255 g PE/mmol V h at 176 psi, and a catalyst productivity of 2,629 kg PE/kg cat h.

The polyethylene was examined by GPC and was found to have a weight average molecular weight of 139,993, a number average molecular weight of 45,145 and a broad molecular weight distribution of 3.1. The bulk density of the produced PE resin was found to be 0.335 g/cm³. The Low Melt Index ($MI_{2.16}$) was measured at 0.9 dg/min and the density was 0.940 g/cm³.

Example 20

Synthesis of Catalyst Precursor K

To a 100 ml three-necked round bottom flask, equipped with a condenser and stirrer, 9.5 g of polyvinylchloride spheres of 35 um average particle size were charged. The flask containing the polyvinylchloride was heated up to 71° C. using an oil bath and then evacuated at 30 mm Hg pressure for 30 minutes. The flask and its content were then purged with dried nitrogen and the polyvinylchloride was slurried using 40 cm³ of isopentane. Then 2 cm³ of 2M butylmagnesium chloride was added to the slurry and the resultant mixture was stirred for 30 minutes at 25° C. Then 0.2 cm3 of 2M ethanol in n-hexane was added to the slurry mixture and was allowed to mix for another 15 minutes. That was followed by the addition of 0.75 cm³ of modified methylaluminoxane (M-MAO type 3A, 7% wt Al) supplied by Akzo Nobel which was stirred at 30° C. for 15 minutes.

The stirring continued and isopentane solvent was allowed to evaporate at 39° C. under nitrogen purge until a white solid powder was produced. After which the solid product was stirred with vanadocene dichloride solution (0.085 g of $Cp_2VCl_2$ in 50 $cm^3$ toluene) for 90 minutes at 55° C. The stirring was then stopped and the supernatant liquid was removed by cannula. The resulting solid was washed by stirring with 50 $cm^3$ of isopentane. Finally, the solid catalyst was dried using a nitrogen purge for thirty minutes to yield a free-flowing greenish colored powder.

The solid catalyst component was analyzed by atomic adsorption spectroscopy and was found to contain 0.089% by weight of vanadium atoms, 0.79% by weight of magnesium atoms, and 0.15% by weight of aluminium atoms ([Al]:[V] molar ratio=3:1).

Example 21

Ethylene Polymerization

An autoclave with a volume of 2 liters was purged with nitrogen at 130° C. for 30 minutes. After cooling the autoclave to 80° C., one liter of n-hexane was introduced to the reactor, then the reactor was pressurized with 3.0 bar of hydrogen first, then followed by 12 bar of ethylene. Afterwards, 4 $cm^3$ of M-MAO solution Type 3A by Akzo-Nobel (7 wt % Al) was injected into the reactor by means of a catalyst injection pump. This was followed by injection of 0.12 g of the solid catalyst precursor K described in Example 20 after being slurried in 20 $cm^3$ of n-hexane solvent. The reactor temperature was raised to 86° C.

Ethylene polymerization was carried out for 70 minutes; with ethylene supplied on demand to maintain the total reactor pressure at 15 bar. 259 liters of ethylene were consumed and 289.3 grams of polyethylene were recovered. That translates into an activity of 150,415 g PE/mmol V h at 176 psi, and a catalyst productivity of 3,263 kg PE/kg cat h.

The polyethylene was examined by GPC and was found to have a weight average molecular weight of 157,993, a number average molecular weight of 43,345 and a broad molecular weight distribution of 3.6. The bulk density of the produced PE resin was found to be 0.311 $g/cm^3$. The Low Melt Index ($MI_{2.16}$) was measured at 0.55 dg/min and the density was 0.940 $g/cm^3$.

Example 22

Synthesis of Catalyst Precursor M

To a 100 ml three-necked round bottom flask, equipped with a condenser and stirrer, 9.5 g of polyvinylchloride (outside source) spheres of 36 um average particle size were placed. The flask containing the polyvinylchloride was heated up to 71° C., using an oil bath and then evacuated at 30 mm Hg pressure for 30 minutes.

The flask and its content were then purged with dried nitrogen and the polyvinylchloride was slurried using 30 $cm^3$ of isopentane at 30° C. Then 2.5 $cm^3$ of butylmagnesium chloride (supplied by Aldrich, 2.0 molar in diethylether) was added to the slurry and the resultant mixture was stirred for 25 minutes at 25° C. under reflux conditions. After which 0.11 $cm^3$ of tetrabutoxy titanium (1 molar solution in n-hexane) was added to the catalyst mixture via syringe under continuous stirring and was allowed to mix for another 15 minutes.

After which 0.5 $cm^3$ of modified methylaluminoxane (M-MAO type 3A, 7% wt Al) supplied by Akzo Nobel was added to the catalyst mixture and allowed to stir for another 15 minutes only.

The isopentane was evaporated to obtain a free flowing yellowish or beige powder by using a nitrogen purge heating at 55° C. Then the modified polyvinylchloride support was slurried using a $Cp_2VCl_2$ solution (0.085 g of $Cp_2VCl_2$ in 25 $cm^3$ toluene), and the resulting mixture was stirred at 55° C. for 90 minutes. The supernatant liquid was decanted and the resulting solid product was washed by stirring with 50 $cm^3$ of isopentane and then removing the isopentane. Finally, the solid catalyst was dried using a nitrogen purge at 60° C. to yield a free-flowing pale brown colored solid product.

The solid catalyst component was analyzed by atomic adsorption spectroscopy and was found to contain 0.092% by weight of vanadium atoms, 0.91% by weight of magnesium atoms, 0.249% by weight of aluminium atoms and 0.03% by weight of titanium atoms.

Example 23

Ethylene Polymerization

An autoclave with a volume of 2 liters was purged with nitrogen at 130° C. for 30 minutes. After cooling the autoclave to 80° C., one liter of n-hexane was introduced to the reactor, then the reactor was pressurized with 3.0 bar of hydrogen first, then followed by 12 bar of ethylene. Afterwards, 4 $cm^3$ of M-MAO solution Type 3A by Akzo-Nobel (7 wt % Al) was injected into the reactor by means of a catalyst injection pump. This was followed by injection of 0.12 g of the solid catalyst M described in Example 20 after being slurried in 20 $cm^3$ of n-hexane solvent. The reactor temperature was raised to 86° C.

Ethylene polymerization was carried out for 70 minutes; with ethylene supplied on demand to maintain the total reactor pressure at 15 bar. 299 liters of ethylene were consumed and 317 grams of polyethylene were recovered, giving 162,982 g PE/mmol V h at 176 psi catalyst activity and 2,641 kg PE/kg cat h catalyst productivity.

The polyethylene was examined by GPC and was found to have a weight average molecular weight of 170,113, a number average molecular weight of 52,345 and a broad molecular weight distribution of 3.2. The bulk density of the produced PE resin was found to be 0.323 $g/cm^3$. The Low Melt Index ($MI_{2.16}$) was measured at 0.51 dg/min and the density was 0.947 $g/cm^3$.

Example 24

Synthesis of Catalyst Precursor N

To a 100 ml three-necked round bottom flask, equipped with a condenser and stirrer, 10 g of polyvinylchloride (outside source) spheres of 36 um average particle size were placed. The flask containing the polyvinylchloride was heated up to 71° C., using an oil bath and then evacuated at 30 mm Hg pressure for 30 minutes.

The flask and its content were then purged with dried nitrogen and the polyvinylchloride was slurried using 30 $cm^3$ of isopentane at 30° C. Then 2.5 $cm^3$ of butylmagnesium chloride (supplied by Aldrich, 2.0 molar in diethylether) was added to the slurry and the resultant mixture was stirred for 25 minutes at 25° C. under reflux conditions. Then 0.2 $cm^3$ of 1 M ethanol in n-hexane was added to the slurry to be mixed for 5 minutes at room temperature. After which 0.7 $cm^3$ of tetrabutoxy titanium (1 molar solution in n-hexane) was added to the catalyst mixture via syringe under continuous stirring and was allowed to mix for another 15 minutes also at room temperature.

The isopentane was evaporated to obtain a free flowing yellowish or beige powder by using a nitrogen purge heating at 55° C. Then the modified polyvinylchloride support was slurried using a CpTiCl$_3$ solution (0.095 g of CpTiCl$_3$ in 35 cm$^3$ toluene), and the resulting mixture was stirred at 57° C. for 90 minutes. The supernatant liquid was decanted and the resulting solid product was washed by stirring with 50 cm$^3$ of isopentane and then removing the isopentane. Finally, the solid catalyst was dried using a nitrogen purge at 60° C. to yield a free-flowing pale brown colored solid product.

The solid catalyst component was analyzed by atomic adsorption spectroscopy and was found to contain 0.27% by weight of titanium atoms and 0.91% by weight of magnesium atoms.

Example 25

Ethylene Polymerization

An autoclave with a volume of 3 liters was purged with nitrogen at 130° C. for 30 minutes. After cooling the autoclave to 80° C., one liter of n-hexane was introduced to the reactor, then the reactor was pressurized with 3.0 bar of hydrogen first, then followed by 12 bar of ethylene. Afterwards, 4 cm$^3$ of M-MAO solution (7 wt % Al, Type 3 from Akzo-Nobel) was injected into the reactor by means of a catalyst injection pump. This was followed by injection of 0.075 g of the solid catalyst precursor N described in Example 20 after being slurried in 20 cm$^3$ of n-hexane solvent. The reactor temperature was raised to 86° C.

Ethylene polymerization was carried out for 60 minutes; with ethylene supplied on demand to maintain the total reactor pressure at 15 bar. 559 liters of ethylene were consumed and 767.3 grams of polyethylene were recovered, giving a catalyst productivity of 10,230 g PE/g cat.

The polyethylene was examined by GPC and was found to have a weight average molecular weight of 137,993, a number average molecular weight of 38,345 and a broad molecular weight distribution of 3.5. The bulk density of the produced PE resin was found to be 0.331 g/cm$^3$. The Low Melt Index (MI$_{2.16}$) was measured at 0.85 dg/min and the density was 0.940 g/cm$^3$.

As can be seen from the results, the catalyst precursor used in example 25 comprising a metal alkoxy compound and alcohol on the titanium metallocene catalyst causes an increase in the titanium loading and results in an increase in productivity to a value of about 11,000 g PE/g cat h.

The features disclosed in the foregoing description, in the claims and/or in the accompanying drawings may, both separately and in any combination thereof, be material for realizing the invention in diverse forms thereof.

What is claimed is:

1. A catalyst precursor for the polymerization of olefins comprising a metallocene compound, a magnesium containing compound, a metal alkoxy compound, and a support comprising a thermoplastic polymer, wherein the thermoplastic polymer support comprises polyolefin, polyvinylchloride, polyvinylalcohol or polycarbonate, and said support comprises particles having a mean particle diameter of 5 to 200 μm, a pore volume of at least 0.05 ml/g, a pore diameter 200 to 900 Å, and a surface area from 0.2 m$^2$/g to 10 m$^2$/g.

2. The catalyst precursor according to claim 1, wherein the metallocene compound is represented by the general formula (Cp$_z$)MR$_w$X$_y$ wherein Cp represents an unsubstituted or substituted cyclopentadienyl ring, M represents a group IVB or VB transition metal, R represents a hydrocarbyl radical with 1 to 20 carbon atoms, X represents a halogen atom, and wherein $1 \leq z \leq 3$, $0 \leq w \leq 3$, and $0 \leq y \leq 3$.

3. The catalyst precursor according to claim 2, wherein the transition metal is titanium, zirconium or vanadium.

4. The catalyst precursor according to claim 3, wherein the metallocene compound is bis(cyclopentadienyl) vanadium dimethyl, bis(cyclopentadienyl) vanadium methyl chloride, bis(cyclopentadienyl) vanadium ethyl chloride, bis(cyclopentadienyl) vanadium dichloride, bis (cyclopentadienyl) zirconium dichloride, bis (cyclopentadienyl) hafnium dichloride, cyclopentadienyl titanium trichloride, bis(cyclopentadienyl) titanium dichloride or cyclopentadienyl zirconium trichloride.

5. The catalyst precursor according to claim 2, wherein the magnesium containing compound is represented by one of the following general formulas: (a) R$^1$MgX, wherein R$^1$ is a hydrocarbon group of 1 to 20 carbon atoms and X is a halogen atom, or (b) R$^2$R$^3$Mg, wherein R$^2$ and R$^3$ are each a hydrocarbon group of 1 to 20 carbon atoms.

6. The catalyst precursor according to claim 5, wherein the magnesium containing compound is diethylmagnesium, dipropylmagnesium, di-iso-propylmagnesium, di-n-butylmagnesium, di-iso-butylmagnesium, butylethylmagnesium, dihexylmagnesium, dioctylmagnesium, butyloctyl magnesium, ethylmagnesium chloride, butylmagnesium chloride, hexylmagesium chloride or mixtures thereof.

7. The catalyst precursor according to claim 5, further comprising aluminum containing compound represented by the general formula R$^5$R$^6$Al—O—AlR$^7$R$^8$ or R$^4_n$AlX$_{3-n}$, wherein R$^5$, R$^6$, R$^7$ and R$^8$ are either the same or different linear, branched or cyclic alkyl groups having 1 to 12 carbon atoms, R$^4$ is a hydrocarbon group having 1 to 10 carbon atoms, X represents a halogen atom or an alkoxy group, and n represents a number satisfying $0 \leq n \leq 3$.

8. The catalyst precursor according to claim 7, wherein the aluminum containing compound comprises methylaluminoxane, modified methylaluminoxane, trimethylaluminium, triethylaluminium, triisobutylaluminum, tri-n-hexylaluminium, dimethylaluminium chloride, diethylaluminium chloride, dimethylaluminium chloride, methylaluminiumdichloride, ethylaluminium dichloride, dimethylaluminium methoxide or dieehtylaluminium ethoxide.

9. The catalyst precursor according to claim 7, wherein M is vanadium and the molar ratio of aluminum to vanadium in the catalyst precursor is in the range of about 2:1 to about 50:1.

10. The catalyst precursor of claim 7, wherein M is titanium and the molar ratio of aluminum to titanium in the catalyst precursor is about 2:1 to about 50:1.

11. The catalyst precursor according to claim 1, wherein the metal alkoxy compound is represented by one of the following general formulas: (a) M(OR)$_n$, where M is a transition metal, R is a hydrocarbon having 1 to 20 carbon atoms, and n represents the number of the alkoxy groups, or (b) M(OR)$_a$X$_b$, where R represents a hydrocarbon group having 1 to 20 carbon atoms, M is a transition metal, X is a halogen atom, and a and b represent numbers satisfying $1 \leq a \leq 4$, $0 \leq b \leq 3$ and a+b=4 when M is a tetravalent transition metal.

12. The catalyst precursor according to claim 11, wherein the metal alkoxy compound is tetramethoxy titanium, tetraethoxy titanium, tetrapropoxy titanium, tetrabutoxy titanium, tetraisobutoxy titanium, tetrapentoxy titanium, trimethoxy chloro titanium, diethoxydichloro titanium, trichloroethoxy titanium, tetramethoxy zirconium, tetraethoxy zirconium, tetrabutoxy zirconium, tetraisobutoxy zirconium, or trimethoxychloro titanium.

13. The catalyst precursor according to claim 1, further comprising a silicon containing compound represented by the general formula $SiX_4$ or $SiR_aX_b$, wherein R represents a hydrocarbon group having 1 to 20 carbon atoms, X represents a halogen atom, and a and b represent numbers satisfying $0 \leq a \leq 4$, $0 \leq b \leq 4$, and $a+b=4$.

14. The catalyst precursor according to claim 13, wherein the silicon containing compound is silicon tetrachloride, trichloro methyl silane, dichloro dimethyl silane, trimethyl chloro silane, tetramethyl silane, or trichloro ethyl silane.

15. The ctalyst precursor according to claim 1, further comprising an alcohol represented by the general formula ROH, wherein R represents a hydrocarbon group having 1 to 20 carbon atoms.

16. The catalyst precursor according to claim 15, wherein the alcohol comprises methylalcohol, ethylalcohol, propylalcohol or isopropylalcohol.

17. A process for the copolymerization of olefins, comprising contacting olefins with the catalyst precursor of claim 1 in the presence of a cocatalyst and under polymerization conditions.

18. The process according to claim 17, wherein the cocatalyst is represented by the general formula $R^4_n AlX_{3-n}$ or $R^5R^6Al-O-AlR^7R^8$, where $R^4$ represents a hydrocarbon group having 1 to 10 carbon atoms, X represents a halogen atom or an alkoxy group, n represents a number satisfying $0 \leq n \leq 3$, and $R^5$, $R^6$, $R^7$ and $R^8$ each represent a hydrocarbon group having 1 to 10 carbon atoms.

19. The process according to claim 17, wherein the cocatalyst comprises a trialkylaluminum compound or an alkylaluminoxane.

\* \* \* \* \*